US012810480B2

(12) United States Patent
Kishimoto et al.

(10) Patent No.: US 12,810,480 B2
(45) Date of Patent: Nov. 24, 2026

(54) MESH DECODING DEVICE, MESH DECODING METHOD, AND PROGRAM

(71) Applicant: KDDI CORPORATION, Tokyo (JP)

(72) Inventors: Koki Kishimoto, Fujimino (JP); Kei Kawamura, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 0 days.

(21) Appl. No.: 19/061,192

(22) Filed: Feb. 24, 2025

(65) Prior Publication Data

US 2025/0218047 A1 Jul. 3, 2025

Related U.S. Application Data

(63) Continuation of application No. PCT/JP2023/045387, filed on Dec. 18, 2023.

(30) Foreign Application Priority Data

Dec. 28, 2022 (JP) ............................ JP2022-212378

(51) Int. Cl.

| | |
|---|---|
| ***G06T 9/00*** | (2006.01) |
| ***H04N 19/119*** | (2014.01) |
| ***H04N 19/167*** | (2014.01) |
| ***H04N 19/172*** | (2014.01) |

(52) U.S. Cl.

CPC ............. *G06T 9/00* (2013.01); *H04N 19/119* (2014.11); *H04N 19/167* (2014.11); *H04N 19/172* (2014.11)

(58) Field of Classification Search

CPC ......... G06T 9/00; G06T 9/001; H04N 19/119; H04N 19/167; H04N 19/172; H04N 19/124; H04N 19/597; H04N 19/70

See application file for complete search history.

(56) References Cited

U.S. PATENT DOCUMENTS

| | | | | |
|---|---|---|---|---|
| 6,577,310 | B1 | 6/2003 | Kim et al. | |
| 6,668,091 | B1 | 12/2003 | Kim et al. | |
| 11,523,135 | B2 * | 12/2022 | Aflaki Beni | H04N 19/167 |
| 2020/0219290 | A1 * | 7/2020 | Tourapis | H04N 19/597 |
| 2020/0314435 | A1 * | 10/2020 | Tourapis | G06T 7/74 |

(Continued)

FOREIGN PATENT DOCUMENTS

| | | | |
|---|---|---|---|
| JP | 2000194843 | A | 7/2000 |
| JP | 2012221319 | A | 11/2012 |

(Continued)

OTHER PUBLICATIONS

Joerg Muller et al., "Shading Atlas Streaming"; Graz University of Technology, 2018 (Year: 2018).*

(Continued)

*Primary Examiner* — Dramos Kalapodas

(74) *Attorney, Agent, or Firm* — Holtz, Holtz & Volek PC

(57) ABSTRACT

The present invention enables setting of a decoding method according to characteristics of a mesh in a patch and can reduce the number of bits of a displacement. A mesh decoding device 200 according to the present invention includes a circuit, wherein the circuit: decodes an atlas bit stream and output patch information and frame information; changes a subdivision method based on the patch information and the frame information; and changes an inverse quantization method based on the patch information.

9 Claims, 18 Drawing Sheets

(56) References Cited

U.S. PATENT DOCUMENTS

| | | | | |
|---|---|---|---|---|
| 2021/0006833 | A1 * | 1/2021 | Tourapis | G06T 9/001 |
| 2021/0209807 | A1 * | 7/2021 | Oh | H04N 21/816 |
| 2022/0343545 | A1 * | 10/2022 | Ryu | H04N 19/30 |
| 2025/0173907 | A1 * | 5/2025 | Kim | H04N 19/597 |
| 2025/0200814 | A1 * | 6/2025 | Kim | H04N 19/20 |

FOREIGN PATENT DOCUMENTS

| | | | | |
|---|---|---|---|---|
| WO | WO-2019243663 | A1 * | 12/2019 | H04N 19/137 |
| WO | WO-2023172509 | A1 * | 9/2023 | G06T 9/001 |

OTHER PUBLICATIONS

International Search Report (ISR) (and English language translation thereof) dated Feb. 13, 2024, issued in International Application No. PCT/JP2023/045387.

Written Opinion dated Feb. 13, 2024, issued in International Application No. PCT/JP2023/045387.

Choi, et al., "Overview of the Video-Based Dynamic Mesh Coding (V-DMC) Standard Work", 13th International Conference on Information and Communication Technology Convergence 2022; Nov. 25, 2022; pp. 578-581.

Mammou, et al., "[V-CG] Apple's Dynamic Mesh Coding CfP Response", International Organisation for Standardisation; ISO/IEC JTC 1/SC 29/WG 7; m59281; Apr. 2022.

Mammou, et al., "Video Subdivision based Mesh Coding", 10th European Workshop on Visual Information Processing 2022.IEEE; Oct. 20, 2022; pp. 1-6.

Nishimura, et al., "Hierarchical Arithmetic Coding of Displacements for Dynamic Mesh Compression", Proc. IEEE International Conference on Image Processing 2023; Sep. 11, 2023; pp. 2850-2854.

* cited by examiner

FIG. 4

| mesh_data_unit( tileID, patchIdx ) { | descriptor |
|---|---|
| mdu_triangle_count_minus1[ tileID ][ patchIdx ] | ue(v) |
| mdu_subdivision_enable_flag[ tileID ][ patchIdx ] | u(1) |
| mdu_lod_change_flag[ tileID ][ patchIdx ] | u(1) |
| if(mdu_subdivision_enable_flag[ tileID ][ patchIdx ]){ | |
| mdu_subdivision_method[ tileID ][ patchIdx ] | u(3) |
| mdu_subdivision_num_method[ tileID ][ patchIdx ] | u(3) |
| if(mdu_subdivision_num_method == 0){ | |
| for(i = 0; i < mdu_triangle_count_minus1[ tileID ][ patchIdx ]; i++){ | |
| mdu_subdivision_residuals[ tileID ][ patchIdx ][i] | ue(v) |
| } | |
| } | |
| if(mdu_subdivision_num_method == 1){ | |
| mdu_max_subdivision_iteration_count[ tileID ][ patchIdx ] | u(8) |
| for(i = 0; i < mdu_triangle_count_minus1[ tileID ][ patchIdx ]; i++){ | |
| for(j=0; j < mdu_max_subdivision_iteration_count[ tileID ][ patchIdx ]; j++){ | |
| mdu_subdivision_flag[ tileID ][ patchIdx ][i][j] | u(1) |
| } | |
| } | |
| } | |
| if(mdu_subdivision_method == 2){ | |
| mdu_subdivision_max_iteration_count[ tileID ][ patchIdx ] | u(8) |
| mdu_subdivision_num[ tileID ][ patchIdx ] | u(8) |
| } | |
| mdu_normal_method[ tileID ][ patchIdx ] | u(3) |
| if(mdu_lod_change_flag[ tileID ][ patchIdx ] != 0) | |
| for(i=0;i< mdu_subdivision_iteration_count[ tileID ][ patchIdx ]; i++) | |
| mdu_lod_qp[ tileID ][ patchIdx ][i] | ue(v) |
| } | |
| } | |
| } | |

FIG. 5

| frame_parameter_set() { | descriptor |
|---|---|
| mdu_subdivision_adaption_flag | u(1) |
| if(mdu_subdivision_adaption_flag != 0){ | |
| mdu_border_adaption_method | u(3) |
| if(mdu_border_adaption_method == 0){ | |
| mdu_vertex_adaption_flag | u(1) |
| } | |
| } | |

1. BASE MESH
(NUMBER OF VERTICES = 5, NUMBER OF BASE FACES = 4, AND PATCH SIZE = 2)

2. SUBDIVIDED MESH

MESH DECODING DEVICE, MESH DECODING METHOD, AND PROGRAM

CROSS-REFERENCE TO RELATED APPLICATIONS

The present application is a continuation of PCT Application No. PCT/JP2023/045387, filed on Dec. 18, 2023, which claims the benefit of Japanese patent application No. 2022-212378 filed on Dec. 28, 2022, the entire contents of each application being incorporated herein by reference in its entirety.

TECHNICAL FIELD

The present invention relates to a mesh decoding device, a mesh decoding method, and a program.

BACKGROUND ART

In Non Patent Literature 1: "Khaled Mammou, Jungsun Kim, Alexis Tourapis, Dimitri Podborski, Krasimir Kolarov; [V-CG] Apple's Dynamic Mesh Coding CfP Response; ISO/IEC JTC 1/SC 29/WG 7 m59281, April 2022", a mesh is decoded by being divided into a rough base mesh and a detailed subdivided face, and such a subdivided face is decoded by a video codec. The subdivided face is calculated based on a normal defined for each vertex, and a direction of the normal is different for each vertex.

In addition, in Non Patent Literature 1, a decoding method is defined for each patch by a parameter set for each patch.

SUMMARY OF THE INVENTION

However, in Non Patent Literature 1, since types of the parameters designated for each patch are insufficient, there is a problem that decoding suitable for characteristics of the mesh included in the patch cannot be performed. Therefore, the present invention has been made in view of the above-described problems, and an object of the present invention is to provide a mesh decoding device, a mesh encoding device, a mesh decoding method, and a program that enable setting of a decoding method according to characteristics of a mesh in a patch and can reduce the number of bits of a displacement.

The first aspect of the present invention is summarized as a mesh decoding device including a circuit, wherein the circuit: decodes an atlas bit stream and output patch information and frame information; changes a subdivision method based on the patch information and the frame information; and changes an inverse quantization method based on the patch information.

The second aspect of the present invention is summarized as a mesh decoding method including: decoding an atlas bit stream and outputting patch information and frame information; changing a subdivision method based on the patch information and the frame information; and changing an inverse quantization method based on the patch information.

The third aspect of the present invention is summarized as a program stored on a non-transitory computer-readable medium for causing a computer to function as a mesh decoding device, wherein the mesh decoding device includes a circuit, and the circuit: decodes an atlas bit stream and output patch information and frame information; changes a subdivision method based on the patch information and the frame information; and changes an inverse quantization method based on the patch information.

According to the present invention, it is possible to provide a mesh decoding device, a mesh encoding device, a mesh decoding method, and a program that enable setting of a decoding method according to characteristics of a mesh in a patch and can reduce the number of bits of a displacement.

BRIEF DESCRIPTION OF THE DRAWINGS

FIG. 4 is a diagram illustrating an example of a syntax configuration of a patch data unit (PDU).

FIG. 5 is a diagram illustrating an example of a syntax configuration of a frame parameter set (FPS).

DESCRIPTION OF EMBODIMENTS

An embodiment of the present invention will be described hereinbelow with reference to the drawings. Note that the constituent elements of the embodiment below can, where appropriate, be substituted with existing constituent elements and the like, and that a wide range of variations, including combinations with other existing constituent elements, is possible. Therefore, there are no limitations placed on the content of the invention as in the claims on the basis of the disclosures of the embodiment hereinbelow.

First Embodiment

Hereinafter, a mesh processing system according to the present embodiment will be described with reference to FIGS. 1 to 18.

Figure 1:
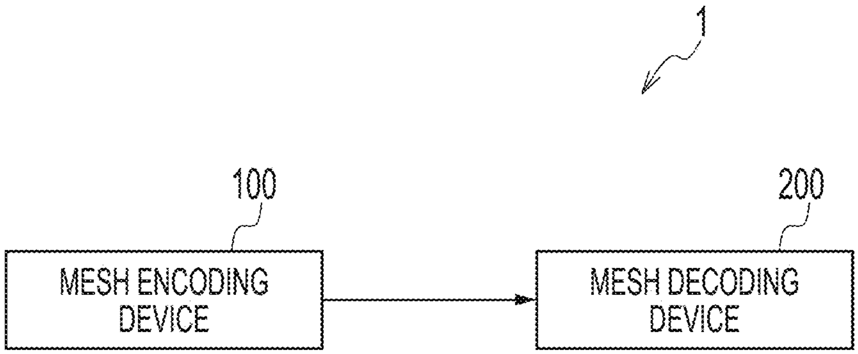
FIG. 1 is a diagram illustrating an example of a configuration of a mesh processing system 1 according to an embodiment.

FIG. 1 is a diagram illustrating an example of a configuration of a mesh processing system 1 according to the present embodiment. As illustrated in FIG. 1, the mesh processing system 1 includes a mesh encoding device 100 and a mesh decoding device 200.

Figure 2:
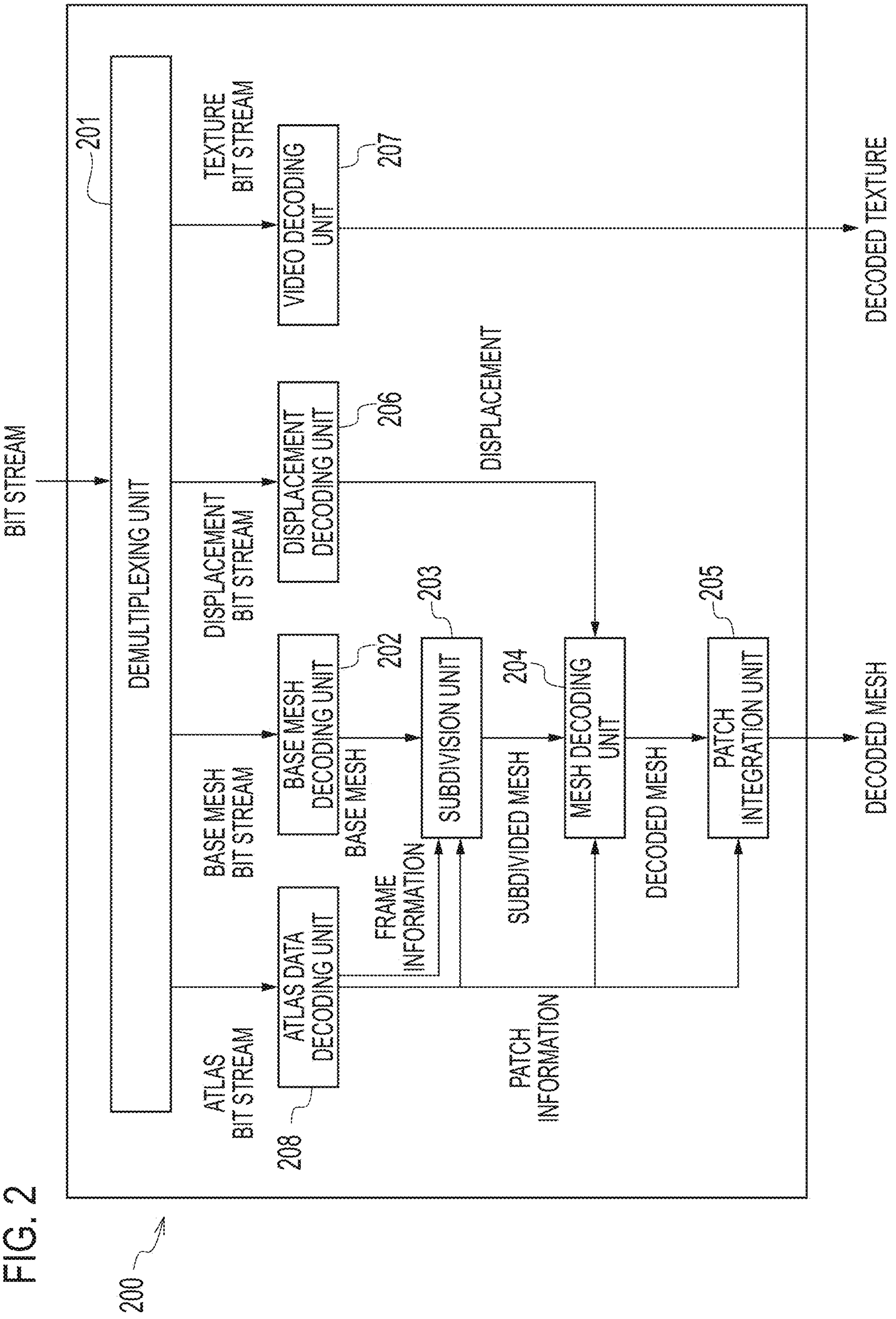
FIG. 2 is a diagram illustrating an example of functional blocks of a mesh decoding device 200 according to an embodiment.

FIG. 2 is a diagram illustrating an example of functional blocks of the mesh decoding device 200 according to the present embodiment.

As illustrated in FIG. 2, the mesh decoding device 200 includes a demultiplexing unit 201, a base mesh decoding unit 202, a subdivision unit 203, a mesh decoding unit 204, a patch integration unit 205, a subdivided face decoding unit 206, a video decoding unit 207, and an atlas data decoding unit 208.

The demultiplexing unit 201 is configured to separate a multiplexed bit stream into a base mesh bit stream, a subdivided face bit stream, a texture bit stream, and an atlas bit stream.

The base mesh decoding unit 202 is configured to decode the base mesh bit stream, and generate and output a base mesh.

The subdivision unit 203 is configured to generate and output added subdivided vertices and connection information thereof from the base mesh decoded by the base mesh decoding unit 202 by a subdivision method indicated by patch information.

Here, the base mesh, the added subdivided vertices, and the connection information thereof are collectively referred to as "subdivided mesh".

The mesh decoding unit 204 is configured to generate and output a decoded mesh using the subdivided mesh generated by the subdivision unit 203 and the subdivided face decoded by the subdivided face decoding unit 206.

The patch integration unit 205 is configured to integrate and output a plurality of patches of the decoded mesh generated by the mesh decoding unit 204.

The subdivided face decoding unit 206 is configured to decode the subdivided face bit stream to generate and output the subdivided face.

The video decoding unit 207 is configured to decode and output texture by video coding. For example, the video decoding unit 207 may use HEVC disclosed in Reference Literature 1 "Information technology-High efficiency coding and media delivery in heterogeneous environments—Part 2: High efficiency video coding, ISO/IEC 23008-2: 2013".

The atlas data decoding unit 208 is configured to decode the atlas bit stream to output frame information and the patch information.

(Atlas Data Decoding Unit 208)

As described above, the atlas data decoding unit 208 is configured to decode the atlas bit stream to output the frame information and the patch information.

Hereinafter, the frame information and the patch information decoded by the atlas data decoding unit 208 will be described with reference to FIGS. 3 to 5.

Figure 3:
FIG. 3 is a diagram illustrating an example of a syntax configuration of an atlas bit stream.

FIG. 3 is a diagram illustrating an example of a syntax configuration of the atlas bit stream.

As illustrated in FIG. 3, first, the atlas bit stream includes a patch data unit (PDU) which is a set of control information corresponding to a patch.

The patch information is a set of control signals defined for each patch obtained by decoding the PDU.

As described above, in the atlas bit stream, one PDU corresponds to each patch.

In addition, as illustrated in FIG. 3, a frame parameter set (FPS) which is a set of control information corresponding to a frame is included.

The frame information is a set of control signals defined for each frame obtained by decoding the FPS.

Note that the configuration of FIG. 3 is merely an example, and elements other than those described above may be added as constituent elements of the atlas bit stream as long as the PDU corresponds to each patch data.

For example, as illustrated in FIG. 3, the atlas bit stream may include a sequence parameter set (SPS).

A syntax configuration of the PDU will be described below with reference to FIG. 4.

FIG. 4 is a diagram illustrating an example of the syntax configuration of the PDU. Here, if syntax functions are similar, syntax names different from those illustrated in FIG. 4 may be used.

In the syntax configuration of the PDU illustrated in FIG. 4, a Descriptor column indicates how each syntax is encoded. Further, ue(v) means an unsigned 0-order exponential-Golomb code, and u(n) means an n-bit flag.

The PDU includes a control signal mdu_triangle_count_minus1 that designates the number of base faces included for each patch.

The PDU includes a flag mdu_subdivision_enable_flag that designates whether or not to perform subdivision for each patch.

The PDU may include a flag mdu_lod_change_flag that designates whether or not to change a quantization value of a subdivided face for each subdivision level of the subdivided face for each patch.

The PDU may include a control signal (mdu_subdivision_ method) that designates a type of the subdivision method of the base mesh for each patch.

For example, when mdu_subdivision_method=0, it may be defined that an initial subdivided mesh is generated using a mid-edge division method, and when mdu_subdivision_method=1, it may be defined that the initial subdivided mesh is generated using an N2 division method.

The PDU may include a control signal (mdu_division_num_method) that designates a type of a subdivision division number generation method for each patch.

The PDU may include a control signal (mdu_division_residuals) that designates an error of a predicted value of the number of subdivisions for each patch.

The PDU may include a control signal (mdu_max_subdivision_iteration_count) that designates the number of times of subdivision processing for each patch.

The PDU may include a control signal (mdu_subdivision_ flag) that designates whether or not to recursively subdivide the base face for each of indices i (i=0, . . . , and mdu_triangle_count_minus1) and j (j=0, . . . , and mdu_subdivision_iteration_count).

The PDU may include a control signal (mdu_subdivision_ num) that designates the number of divisions of the base face in one subdivision processing for each patch.

The PDU may include a control signal (mdu_normal_method) that designates a type of a method of calculating a subdivided vertex normal for each patch.

The PDU may include a control signal (mdu_lod_qp) that designates the quantization value of the subdivided face for each subdivision level for each patch.

The subdivision level is the number of times of subdivision processing at the current stage. For example, the subdivision level of 1 means that the subdivision processing has been performed on the base face once.

Hereinafter, a syntax configuration of the FPS will be described with reference to FIG. 5.

FIG. 5 is a diagram illustrating an example of the syntax configuration of the FPS. Here, if syntax functions are similar, syntax names different from those illustrated in FIG. 5 may be used.

In the syntax configuration of the FPS illustrated in FIG. 5, a Descriptor column is similar to the PDU.

The FPS may include a flag (mdu_border_adaption_flag) indicating whether or not to perform subdivision adjustment for each frame.

The FPS may include a control signal (mdu_border_adaption_method) that designates a subdivision adjustment method for each frame.

The FPS may include a flag (mdu_vertex_adaption_flag) indicating whether or not to move an edge division point in a subdivided mesh adjustment unit for each frame.

(Subdivision Unit 203)

As described above, the subdivision unit 203 is configured to generate and output the added subdivided vertices and the connection information thereof from the base mesh decoded by the base mesh decoding unit 202 by the subdivision method indicated by the control information.

Here, the base mesh, the added subdivided vertices, and the connection information thereof are collectively referred to as "subdivided mesh".

The subdivision unit 203 is configured to specify the type of the subdivision method from subdivision_method which is control information generated by decoding the atlas bit stream.

Hereinafter, the subdivision unit 203 will be described with reference to FIGS. 6A and 6B.

Figure 6A:
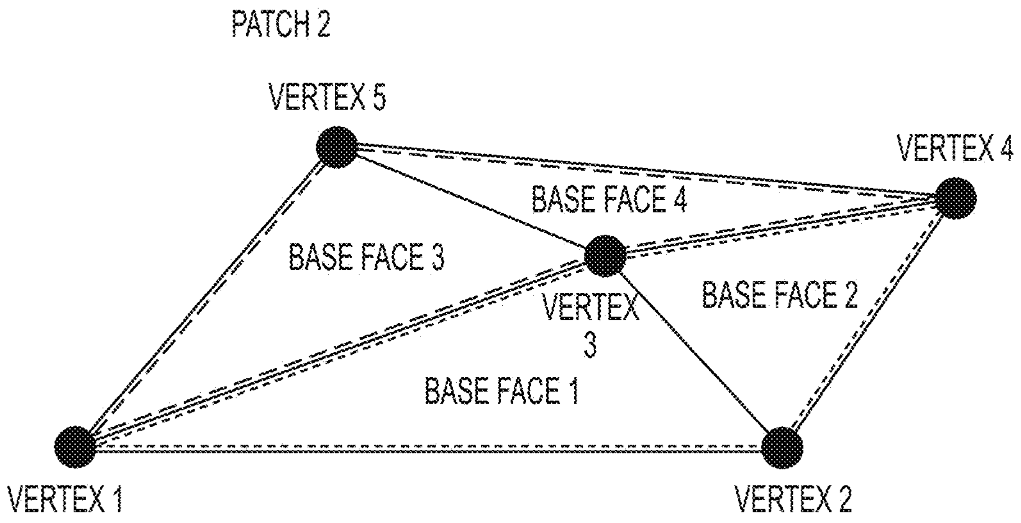
FIG. 6A is a diagram illustrating an example of a base mesh and a subdivided mesh.
Figure 6B:
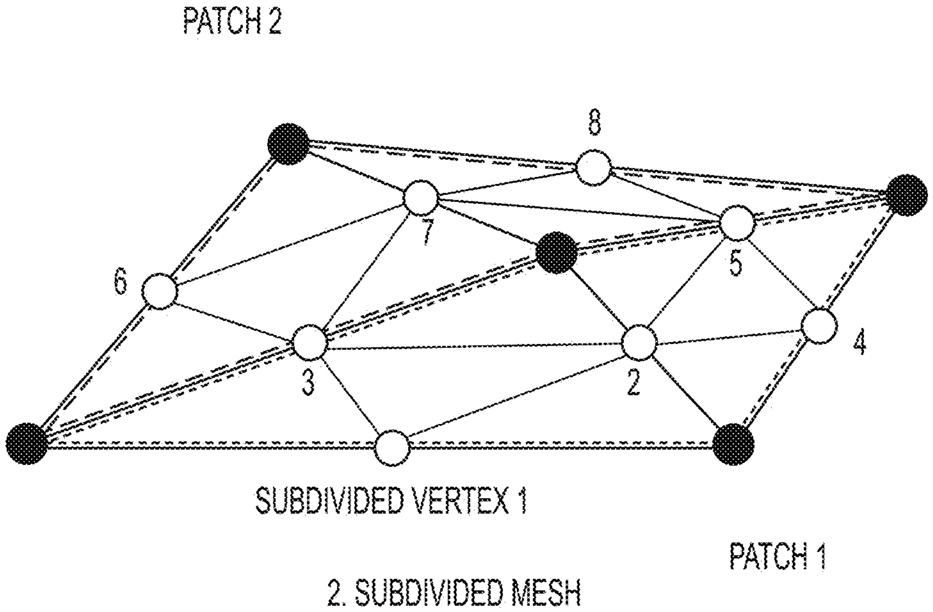
FIG. 6B is a diagram illustrating an example of the base mesh and the subdivided mesh.

FIGS. 6A and 6B are diagrams for explaining an example of an operation of generating the subdivided vertex from the base mesh.

FIG. 6A is a diagram illustrating an example of the base mesh including five vertices.

Here, for subdivision, for example, a mid-edge division method of connecting midpoints of edges in each base face may be used. As a result, a certain base face is divided into four faces.

FIG. 6B illustrates an example of the subdivided mesh obtained by dividing the base mesh including five vertices. In the subdivided mesh illustrated in FIG. 6B, eight subdivided vertices (white circles) are generated in addition to the original five vertices (black circles).

As the subdivided face decoding unit 206 decodes the subdivided face for each subdivided vertex generated in this manner, improvement in encoding performance can be expected.

In addition, the subdivision unit 203 may apply a different subdivision method for each patch. Therefore, the subdivided face decoded by the subdivided face decoding unit 206 is adaptively changed for each patch, and the improvement in encoding performance can be expected. Information regarding the divided patch is received as patch_id that is control information.

Figure 7:
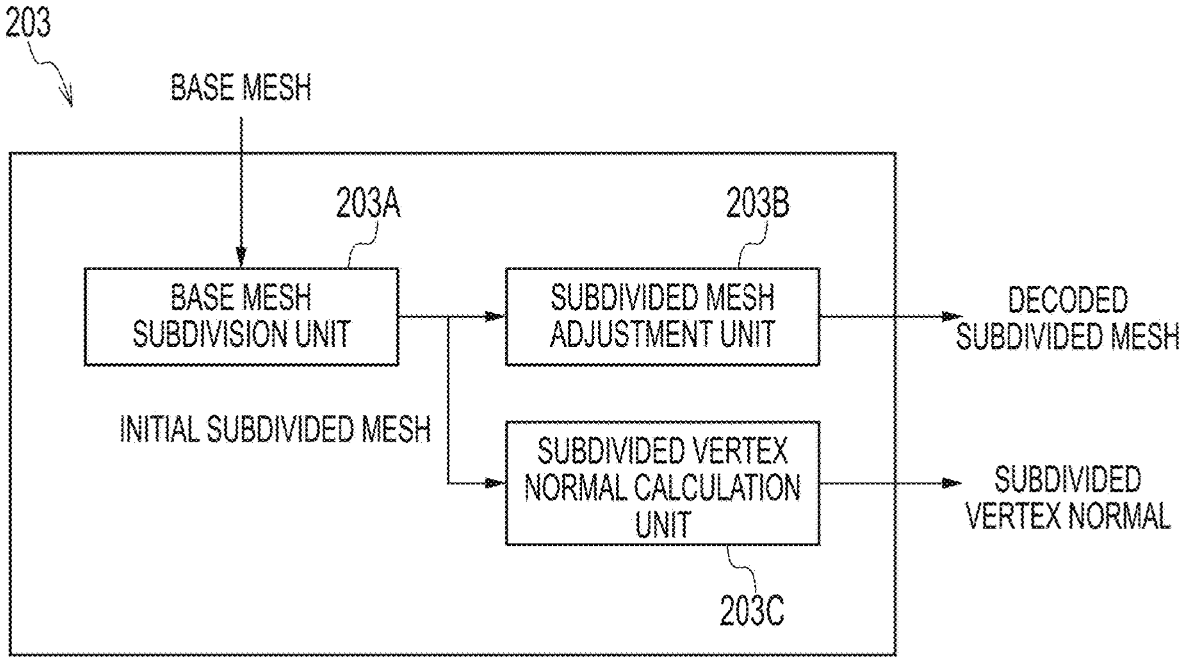
FIG. 7 is a diagram illustrating an example of functional blocks of a subdivision unit 203 of the mesh decoding device 200 according to an embodiment.

Hereinafter, the subdivision unit 203 will be described with reference to FIGS. 7 to 9. FIG. 7 is a diagram illustrating an example of functional blocks of the subdivision unit 203.

As illustrated in FIG. 7, the subdivision unit 203 includes a base mesh subdivision unit 203A, a subdivided mesh adjustment unit 203B, and a subdivided vertex normal calculation unit 203C.

(Base Mesh Subdivision Unit 203A)

The base mesh subdivision unit 203A is configured to calculate the number of divisions (the number of subdivisions) for each of the base face and a base patch based on the input base mesh and division information of the base mesh, subdivide the base mesh based on the number of divisions, and output the initial subdivided mesh.

Here, a subdivided face is a face included in the subdivided mesh, and the subdivided mesh is a mesh obtained by subdividing the base face at least once.

That is, the base mesh subdivision unit 203A may be configured such that the above-described number of divisions can be changed in units of base faces and base patches.

Here, the base face is a face included in the base mesh, and the base patch is a set of several base faces.

Furthermore, the base mesh subdivision unit 203A may be configured to predict the number of subdivisions of the base face, and calculate the number of subdivisions of the base face by adding a predicted division number residual to the predicted number of subdivisions of the base face.

Furthermore, the base mesh subdivision unit 203A may be configured to calculate the number of subdivisions of the base face based on the number of subdivisions of a base face adjacent to the base face.

Furthermore, the base mesh subdivision unit 203A may be configured to calculate the number of subdivisions of the base face based on the number of subdivisions of the base face accumulated immediately before.

Furthermore, the base mesh subdivision unit 203A may be configured to calculate the number of subdivisions of the base face based on the number of subdivisions mdu_subdivision_num defined for each patch.

Furthermore, the base mesh subdivision unit 203A may be configured to generate vertices that divide three edges forming the base face, and subdivide the base face by connecting the generated vertices.

As illustrated in FIG. 7, a subdivided mesh adjustment unit 203B and a subdivided vertex normal calculation unit

203C described below are provided at positions downstream of the base mesh subdivision unit 203A.

Hereinafter, an example of processing in the base mesh subdivision unit 203A will be described with reference to FIGS. 8 to 10.

Figure 8:
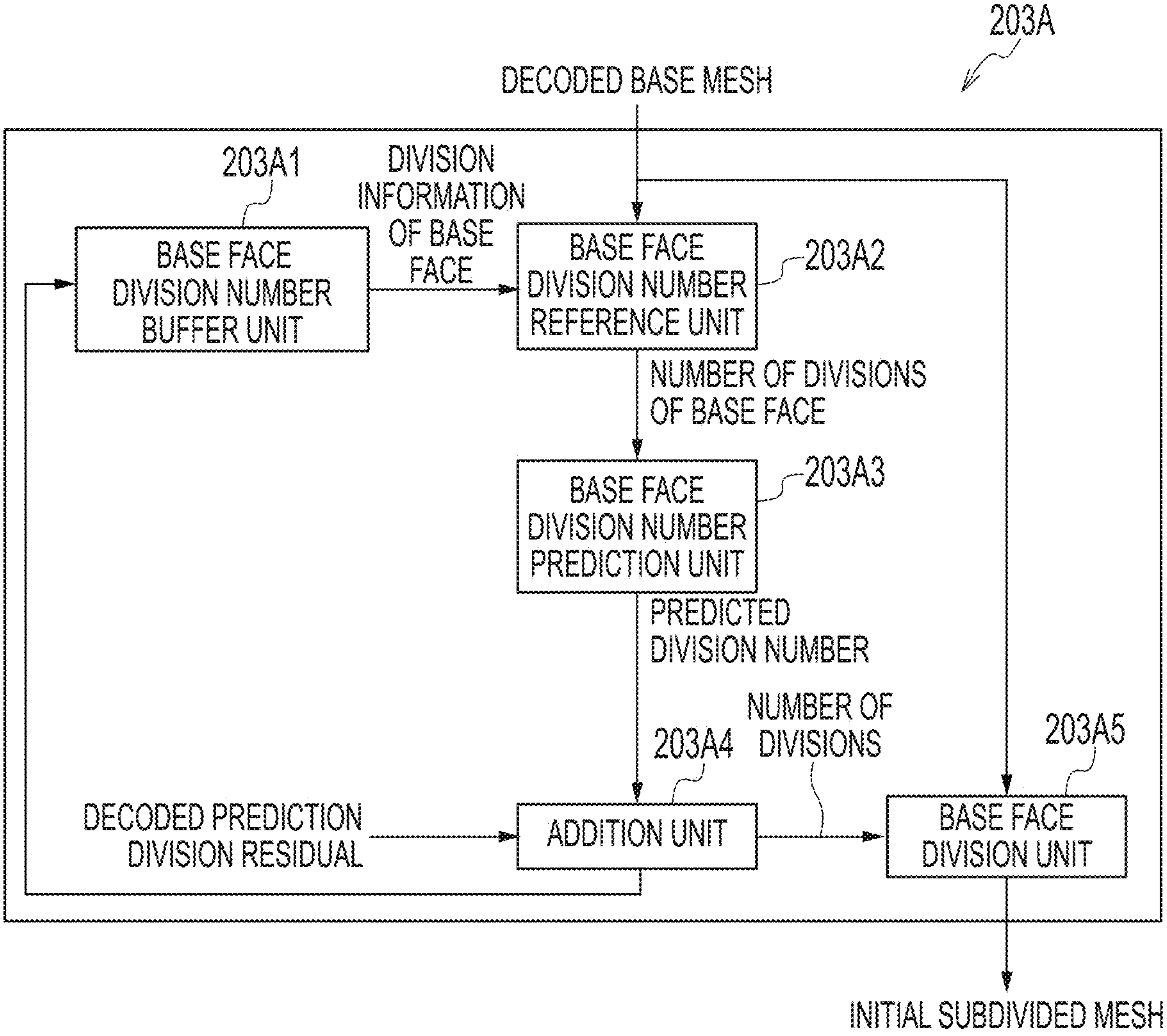
FIG. 8 is a diagram illustrating an example of functional blocks of a base mesh subdivision unit 203A of the subdivision unit 203 of the mesh decoding device 200 according to an embodiment.
Figure 10:
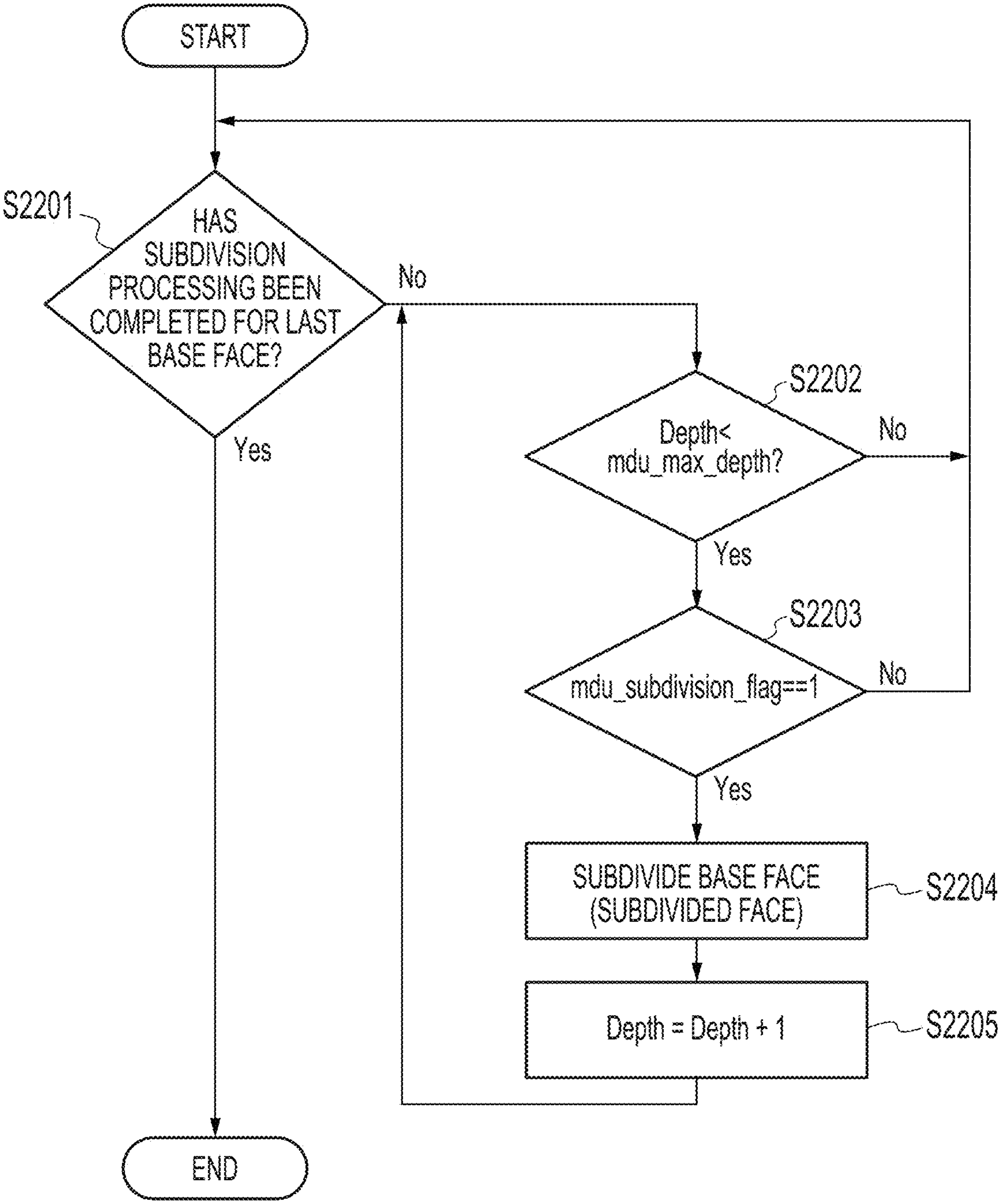
FIG. 10 is a flowchart illustrating an example of an operation of the base mesh subdivision unit 203A of the subdivision unit 203 of the mesh decoding device 200 according to an embodiment.

FIG. 8 is a diagram illustrating an example of functional blocks of the base mesh subdivision unit 203A, and FIG. 10 is a flowchart illustrating an example of an operation of the base mesh subdivision unit 203A.

As illustrated in FIG. 8, the base mesh subdivision unit 203A includes a base face division number buffer unit 203A1, a base face division number reference unit 203A2, a base face division number prediction unit 203A3, an addition unit 203A4, and a base face division unit 203A5.

The base face division number buffer unit 203A1 stores division information of the base face including the number of divisions of the base face, and is configured to output the division information of the base face to the base face division number reference unit 203A2.

Here, a size of the base face division number buffer unit 203A1 may be set to 1, and the base face division number buffer unit 203A1 may be configured to output the number of divisions of the base face accumulated immediately before to the base face division number reference unit 203A2.

That is, by setting the size of the base face division number buffer unit 203A1 to 1, only the number of last decoded subdivisions (the number of subdivisions decoded immediately before) may be referred to.

The base face division number reference unit 203A2 is configured to output "non-referable" to the base face division number prediction unit 203A3 in a case where the base face adjacent to the base face to be decoded does not exist, or in a case where the base face adjacent to the base face to be decoded exists but the number of divisions is not fixed.

On the other hand, the base face division number reference unit 203A2 is configured to output the number of divisions to the base face division number prediction unit 203A3 in a case where the base face adjacent to the base face to be decoded exists and the number of divisions is fixed.

The base face division number prediction unit 203A3 is configured to predict the number of divisions (the number of subdivisions) of the base face based on one or more input numbers of divisions, and output the predicted number of divisions (predicted division number) to the addition unit 203A4.

Here, the base face division number prediction unit 203A3 is configured to output 0 as the predicted division number to the addition unit 203A4 in a case where only "non-referable" is input from the base face division number reference unit 203A2.

Note that the base face division number prediction unit 203A3 may be configured to generate, in a case where one or more numbers of divisions are input, the predicted division number by using any one of statistical values such as an average value, a maximum value, a minimum value, and a mode value of the input number of divisions.

Note that the base face division number prediction unit 203A3 may be configured to generate the number of divisions of the most adjacent face as the predicted division number in a case where one or more numbers of divisions are input.

The addition unit 203A4 is configured to output, to the base face mesh division number buffer unit 203A1 and the base face division unit 203A5, the number of divisions obtained by adding the predicted division number residual decoded from a predicted residual bit stream and the predicted division number acquired from the base face division number prediction unit 203A3.

The base face division unit 203A5 is configured to subdivide the base face based on the number of divisions input from the addition unit 203A4.

Figure 9:
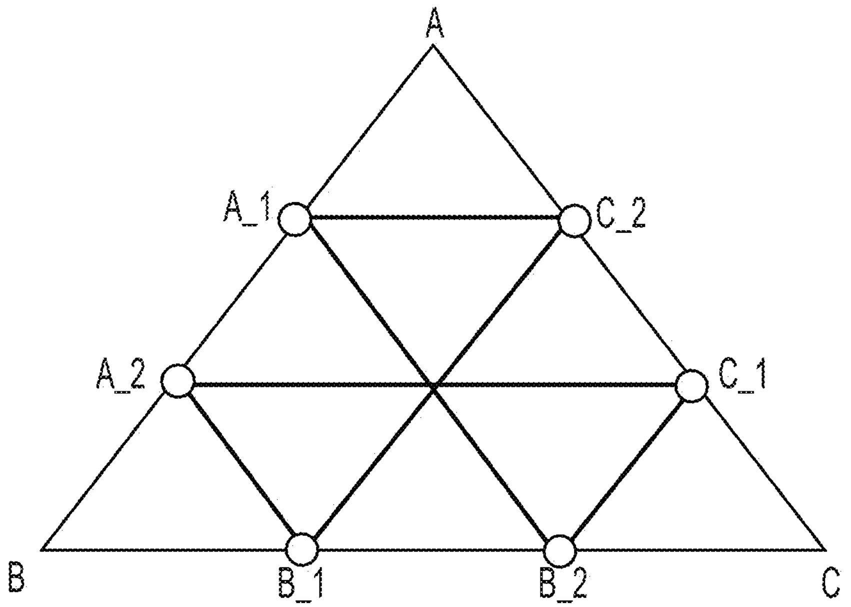
FIG. 9 is a diagram for explaining an example of a method of dividing a base face by a base face division unit 203A5 of the base mesh subdivision unit 203A of the subdivision unit 203 of the mesh decoding device 200 according to an embodiment.

FIG. 9 illustrates an example of a case where the base face is divided into nine. A method of dividing the base face by the base face division unit 203A5 will be described with reference to FIG. 9.

As illustrated in FIG. 9, the base face division unit 203A5 generates points A_1, . . . , and A_(N−1) equally dividing an edge AB forming the base face into N (N=3).

Similarly, the base face division unit 203A5 equally divides an edge BC and an edge CA into N, and generates respective points B_1, . . . , B_(N−1), C_1, . . . , and C_(N−1).

Hereinafter, points on the edge AB, the edge BC, and the edge CA are referred to as "edge division points".

The base face division unit 203A5 generates edges A_i B_(N−i), B_i C_(N−i), and C_i A_(N−i) for all i (i=1, 2, . . . , and N−1), and generates N2 subdivided faces. This division method is hereinafter referred to as N2 division method. The N2 division method is equivalent to the mid-edge division method when N=2.

Next, an example of an operation of the base mesh subdivision unit 203A will be described with reference to FIG. 10.

As illustrated in FIG. 10, in step S2201, the base mesh subdivision unit 203A determines whether or not the subdivision processing has been completed for the last base face. In a case where all the subdivision processings have been completed, the operation ends, otherwise, the operation proceeds to step S2202.

In step S2202, the base mesh subdivision unit 203A determines whether or not Depth<mdu_max_division_iteration_count.

Here, Depth is a variable representing a current depth, an initial value thereof is 0, and mdu_max_subdivision_iteration_count represents a maximum depth determined for each base face.

In a case where the condition in step S2202 is satisfied, the operation proceeds to step S2203, and in a case where the condition is not satisfied, the operation returns to step S2201.

In step S2203, the base mesh subdivision unit 203A determines whether or not mdu_division_flag at the current depth is 1.

In the case of Yes, the operation returns to step S2201, and in the case of No, the operation proceeds to step S2204.

In step S2204, the base mesh subdivision unit 203A further subdivides all the subdivided faces in the base face.

Here, the base mesh subdivision unit 203A subdivides the base face in a case where subdivision processing has never been performed on the base face.

Note that the subdivision method is similar to the method described with reference to FIG. 9.

Specifically, in a case where the base face has never been subdivided, the base mesh subdivision unit 203A subdivides the base face as illustrated in FIG. 9.

On the other hand, in a case where the base face has been subdivided at least once, the base mesh subdivision unit 203A subdivides the subdivided face into N2.

In FIG. 9 as an example, N2 faces are generated by using the N2 division method on a face including a vertex A_2, a vertex B, and a vertex B_1 similarly to the division of the base face.

When the subdivision processing ends, the operation proceeds to step S2205.

In step S2205, the base mesh subdivision unit 203A adds 1 to Depth, and the operation returns to step S2202.

Furthermore, the base mesh subdivision unit 203A may perform the subdivision processing so as to subdivide all the base faces by the same upper limit number of times of subdivision mdu_max_subdivision_iteration_count. At this time, the subdivision processing per one time may be configured to perform subdivision using the N2 division method or may be configured to perform subdivision using the mid-edge division method based on the number of subdivisions mdu_subdivision_num.

(Subdivided Mesh Adjustment Unit 203B)

Next, a specific example of processing performed by the subdivided mesh adjustment unit 203B will be described. Hereinafter, an example of processing performed by the subdivided mesh adjustment unit 203B will be described with reference to FIGS. 11 to 14.

Figure 11:
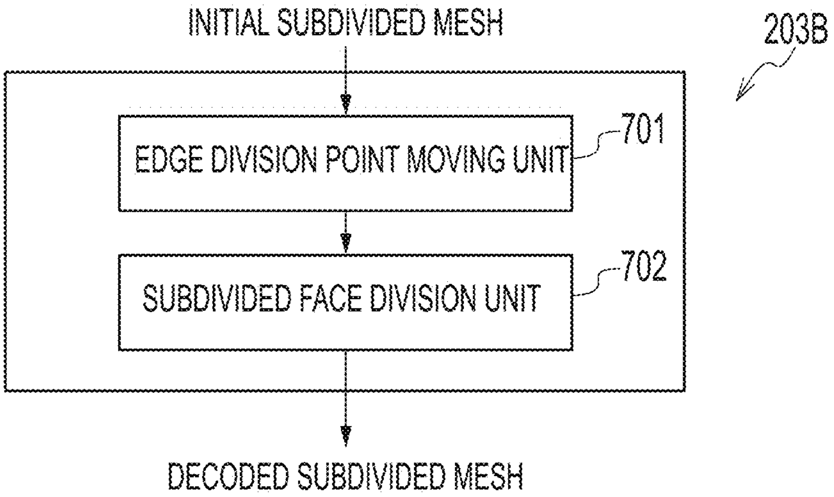
FIG. 11 is a diagram illustrating an example of functional blocks of a subdivided mesh adjustment unit 203B of the subdivision unit 203 of the mesh decoding device 200 according to an embodiment.

FIG. 11 is a diagram illustrating an example of functional blocks of the subdivided mesh adjustment unit 203B.

The subdivided mesh adjustment unit 203B may be configured to adjust the subdivided mesh based on the subdivision adjustment method designated in the frame information output by the atlas data decoding unit 208.

Here, the adjustment is an operation of generating the subdivided mesh in which no hole is formed in the mesh when the mesh is decoded by the mesh decoding unit 204.

In the example of FIG. 11, the subdivided mesh adjustment unit 203B uses a method of adjusting the mesh by moving the vertex of the subdivided face of the initial subdivided mesh and further dividing the subdivided face as the subdivision adjustment method.

As illustrated in FIG. 11, the subdivided mesh adjustment unit 203B includes an edge division point moving unit 701 and a subdivided face division unit 702.

(Edge Division Point Moving Unit 701)

The edge division point moving unit 701 is configured to move an edge division point of the base face to any one of edge division points of adjacent base faces with respect to an input initial subdivided face, and output the subdivided face.

The edge division point moving unit 701 may be configured to output the initial subdivided mesh as it is to the subdivided face division unit 702 without moving the edge division point when mdu_vertex_adaption_flag is 1.

Figure 12:
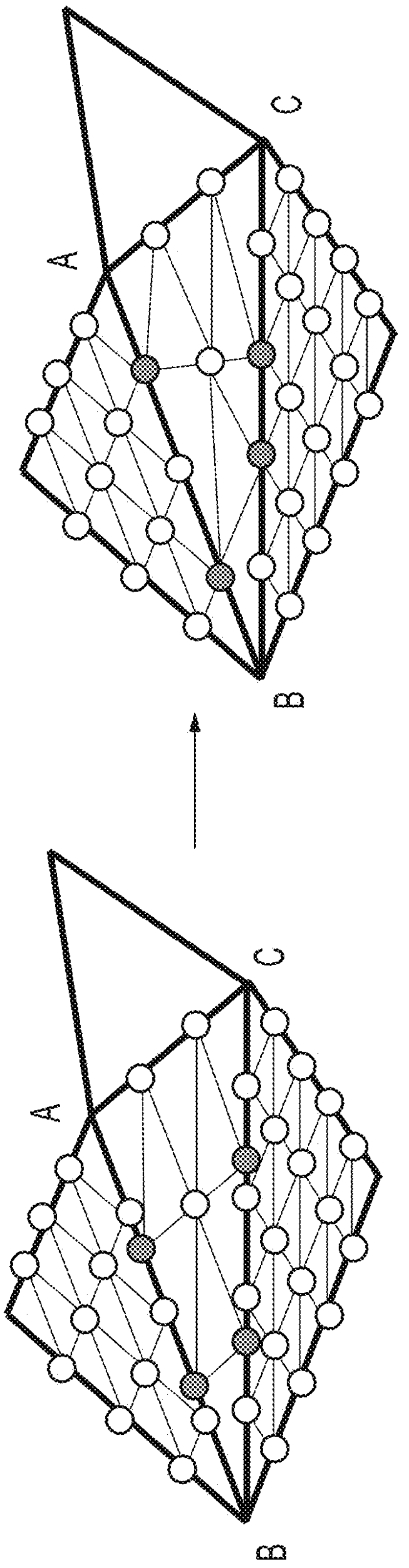
FIG. 12 is a diagram illustrating an example of a case where an edge division point on a base face ABC is moved by an edge division point moving unit 701 of the subdivided mesh adjustment unit 203B of the subdivision unit 203 of the mesh decoding device 200 according to an embodiment.

FIG. 12 illustrates an example of a case where the edge division point on a base face ABC is moved. For example, as illustrated in FIG. 12, the edge division point moving unit 701 may be configured to move the edge division point of the base face ABC to an edge division point of the closest adjacent base face.

(Subdivided Face Division Unit 702)

The subdivided face division unit 702 is configured to subdivide the input subdivided face again and output a decoded subdivided face.

Figure 13:
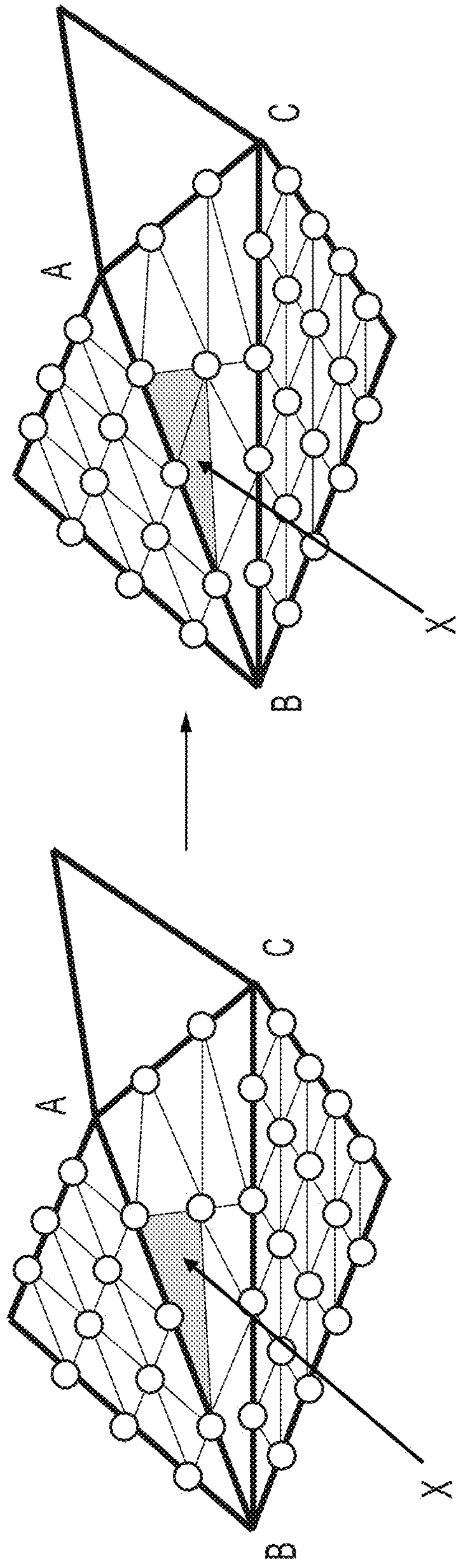
FIG. 13 is a diagram illustrating an example of a case where a subdivided face X in the base face is subdivided again by a subdivided face division unit 702 of the subdivided mesh adjustment unit 203B of the subdivision unit 203 of the mesh decoding device 200 according to an embodiment.

FIG. 13 is a diagram illustrating an example of a case where a subdivided face X in the base face is subdivided again.

As illustrated in FIG. 13, the subdivided face division unit 702 may be configured to generate a new subdivided face in the base face by connecting a vertex forming the subdivided face X and an edge division point of an adjacent base face.

Figure 14:
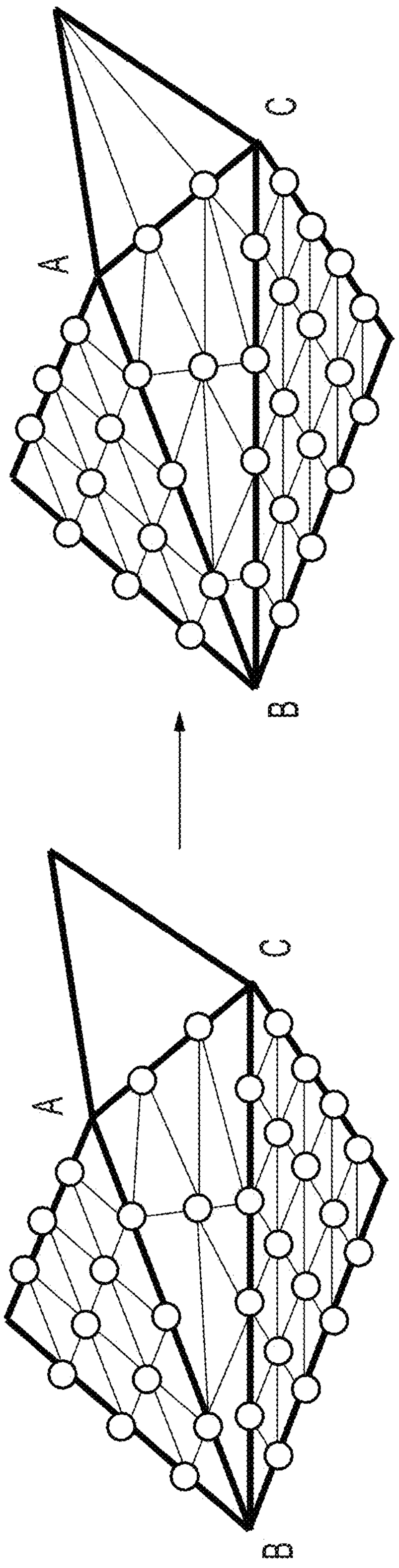
FIG. 14 is a diagram illustrating an example of a case where all the subdivided faces are subdivided again by the subdivided face division unit 702 of the subdivided mesh adjustment unit 203B of the subdivision unit 203 of the mesh decoding device 200 according to an embodiment.

FIG. 14 is a diagram illustrating an example of a case where the above-described subdivision processing is performed on all the subdivided faces.

(Subdivided Vertex Normal Portion Calculation Unit 203C)

The subdivided vertex normal calculation unit 203C is configured to output a normal (subdivided vertex normal) defined for each subdivided vertex for the subdivided vertex forming the input subdivided face.

Hereinafter, an example of processing performed by the subdivided vertex normal portion calculation unit 203C will be described with reference to FIGS. 15 and 16.

Figure 15:
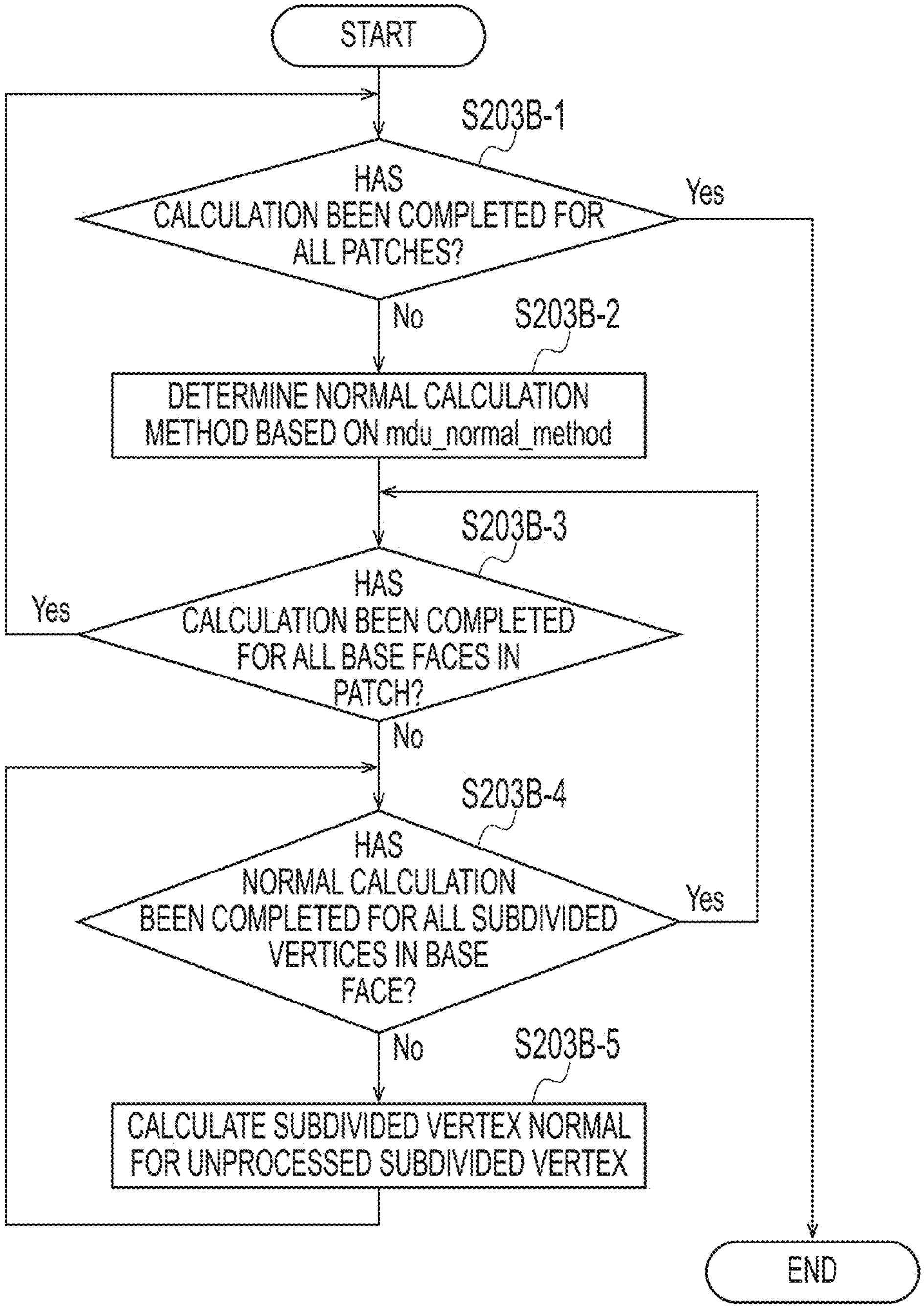
FIG. 15 is a flowchart illustrating an example of an operation of a subdivided vertex normal portion calculation unit 203C of the subdivision unit 203 of the mesh decoding device 200 according to an embodiment.

FIG. 15 is a flowchart illustrating an example of an operation of the subdivided vertex normal portion calculation unit 203C.

As illustrated in FIG. 15, in step S203B-1, the subdivided vertex normal portion calculation unit 203C determines whether or not calculation of the subdivided vertex normal has been completed for all the patches.

In the case of Yes, the operation ends, and in the case of No, the operation proceeds to step S203B-2.

In step S203B-2, the subdivided vertex normal portion calculation unit 203C determines a method of calculating the subdivided vertex normal based on mdu_normal_method, and the operation proceeds to step S203B-3.

In step S203B-3, the subdivided vertex normal portion calculation unit 203C determines whether or not the calculation of the subdivided vertex normal has been completed for all the base faces in the patch.

In the case of Yes, the operation proceeds to step S203B-1, and in the case of No, the operation proceeds to step S203B-4.

In step S203B-4, the subdivided vertex normal portion calculation unit 203C determines whether or not the calculation of the subdivided vertex normal has been completed for all the subdivided vertices in the base face.

In the case of Yes, the operation proceeds to step S203B-3, and in the case of No, the operation proceeds to step S203B-5.

In step S203B-5, the subdivided vertex normal portion calculation unit 203C calculates a subdivided vertex normal of an unprocessed subdivided vertex, and the operation proceeds to step S203B-4.

Figure 16A:
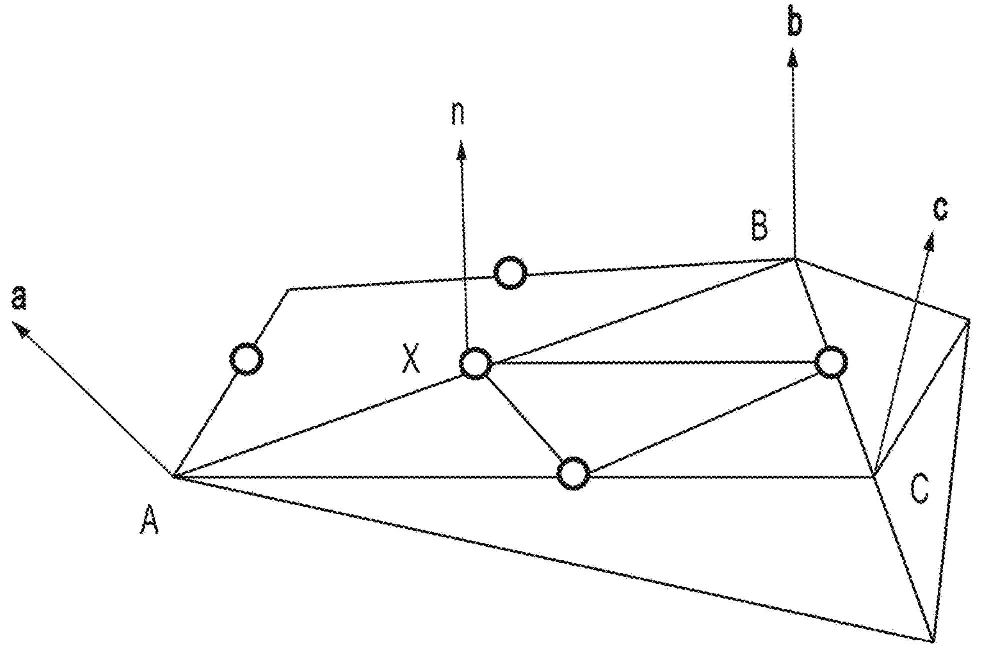
FIG. 16A is a diagram for explaining an example of a method of calculating a subdivided vertex normal by the subdivided vertex normal portion calculation unit 203C.
Figure 16B:
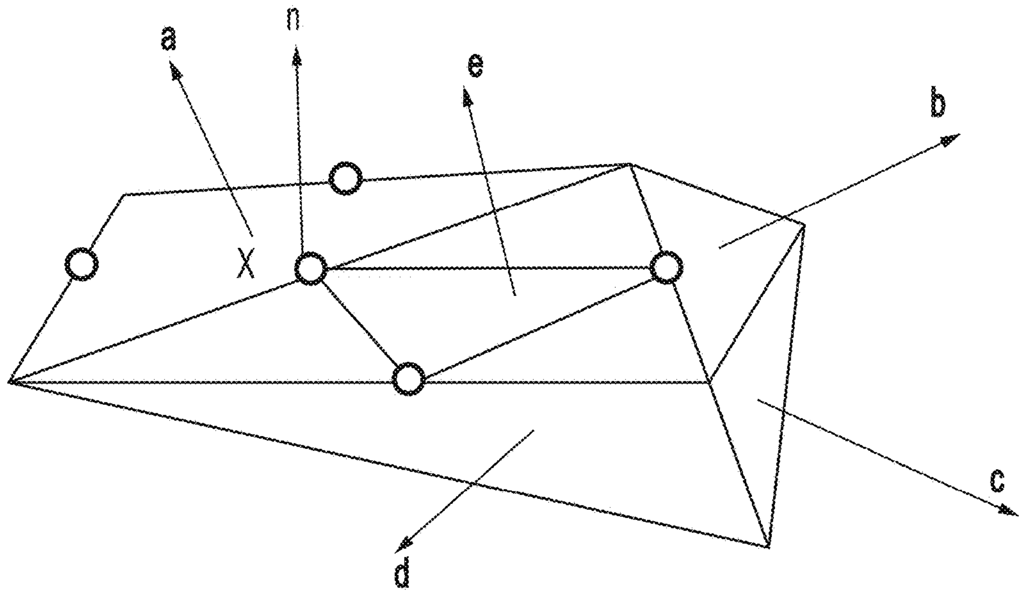
FIG. 16B is a diagram for explaining an example of the method of calculating the subdivided vertex normal by the subdivided vertex normal portion calculation unit 203C.

FIGS. 16A and 16B illustrate that the subdivided vertex normal portion calculation unit 203C calculates a subdivided vertex normal for a subdivided vertex X in a base face ABC in step S203B-5.

An example of a method of calculating the subdivided vertex normal will be described with reference to FIG. 16A.

The subdivided vertex normal portion calculation unit 203C may be configured to calculate a normal n (vector) of the subdivided vertex X on the base face ABC based on the total value of base point normals as expressed in the following (Expression 1).

[Math. 1]

$$n = (a + b + c)/(\|a + b + c\|) \quad \text{(Expression 1)}$$

At this time, a, b, and c (vectors) are normals (base point normals) defined for each base point (a vertex forming the base face).

Furthermore, another example of the method of calculating the subdivided vertex normal will be described with reference to FIG. 16B.

The subdivided vertex normal portion calculation unit 203C may be configured to calculate the normal n (vector) of the subdivided vertex X on the base face ABC based on the total value of normals of base faces adjacent to the base face ABC as expressed in the following (Expression 2).

[Math. 2]

$$n=(a+b+c+d+e)/(\|a+b+c+d+e\|) \quad \text{(Expression 2)}$$

At this time, a, b, c, d, and e (vectors) are face normals (vectors) of the base faces adjacent to the base face ABC.

In addition, the subdivided vertex normal portion calculation unit 203C may simply use the face normal of the base face ABC as the normal (subdivision point normal) of the subdivided vertex X.

With such calculation, basically, the same normal is used as the normal of the subdivision point existing on the same base face.

In a case where the subdivided vertex normal has already been calculated, the subdivided vertex normal portion calculation unit 203C does not have to perform processing of calculating the subdivided vertex normal.

In addition, the subdivided vertex normal portion calculation unit 203C may similarly calculate the base point normal by using the above-described method of calculating the subdivided vertex normal.

At this time, basically, the same normal is used as the subdivision point normal and the base point normal existing on the same base face.

(Subdivided Face Decoding Unit 206)

Figure 17:
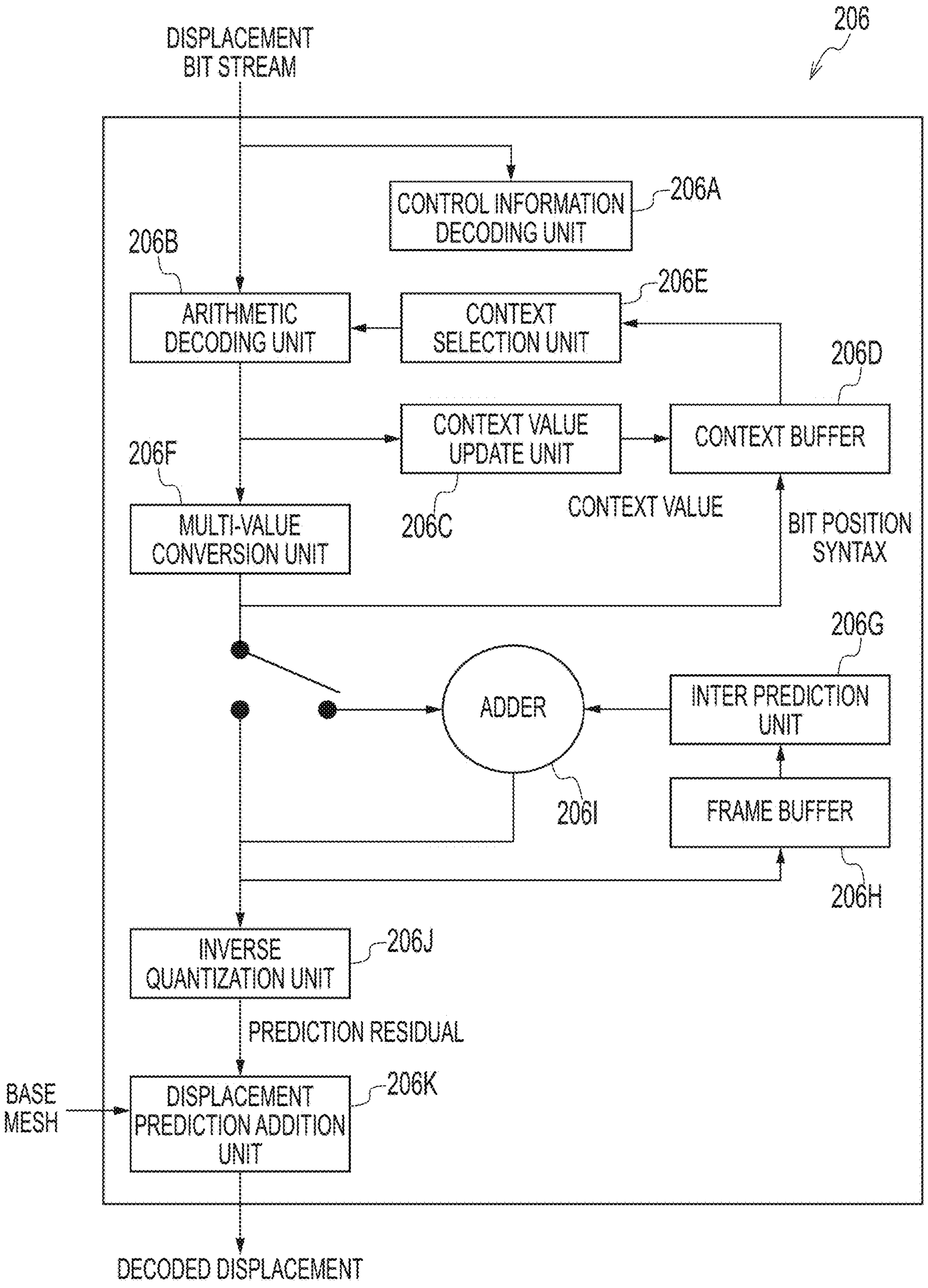
FIG. 17 is a diagram illustrating an example of functional blocks of a subdivided face decoding unit 206 of the mesh decoding device 200 according to an embodiment.

As illustrated in FIG. 17, the subdivided face decoding unit 206 includes a decoding omission determination unit 206A, an arithmetic decoding unit 206B, a context value update unit 206C, a context buffer 206D, a context selection unit 206E, a multi-value conversion unit 206F, an inter prediction unit 206G, a frame buffer 206H, an adder 206I, an inverse quantization unit 206J, and a subdivided face prediction addition unit 206K.

The control information decoding unit 206A is configured to output the control information by performing variable length decoding on the received subdivided face bit stream.

The arithmetic decoding unit 206B is configured to output a binarized coefficient level value by performing arithmetic decoding on the received subdivided face bit stream.

The context value update unit 206C is configured to update a context value by using the binarized coefficient level value and output the updated context value to the context buffer 206D.

The context selection unit 206E is configured to generate and output the context value (the context value for output) by using the context value, a bit position, and the syntax read from the context buffer 206D.

The multi-value conversion unit 206F is configured to generate and output a coefficient level value by multi-value conversion of the binarized coefficient level value. The generated (calculated) coefficient level value is also output to the context buffer 206D as the bit position and the syntax.

The inter prediction unit 206G is configured to generate and output a predicted subdivided face by using a reference frame read from the frame buffer 206H.

The frame buffer 206H is configured to acquire and accumulate a decoded subdivided face. The frame buffer H is configured to output the decoded subdivided face at a corresponding vertex in the reference frame according to the control information (not illustrated).

The adder 206I is configured to acquire the inter prediction residual and the inter prediction subdivided face from the inter prediction unit 206G. The adder 206I is configured to add the inter prediction residual and the inter prediction subdivided face to generate and output a quantized intra prediction residual. The generated (calculated) quantized intra prediction residual is also output to the frame buffer 206H.

The inverse quantization unit 206J is configured to perform inverse quantization on the quantized intra prediction residual acquired from the adder 206I and output an intra prediction residual. Details thereof will be described below.

The subdivided face prediction addition unit 206K is configured to decode the subdivided face by performing the intra prediction of the subdivided face of the subdivided vertex based on the base mesh output from the base mesh decoding unit 202 to calculate an intra prediction value, and adding the calculated intra prediction value and the intra prediction residual output from the inverse quantization unit 206J.

(Inverse Quantization Unit 206J)

Figure 18:
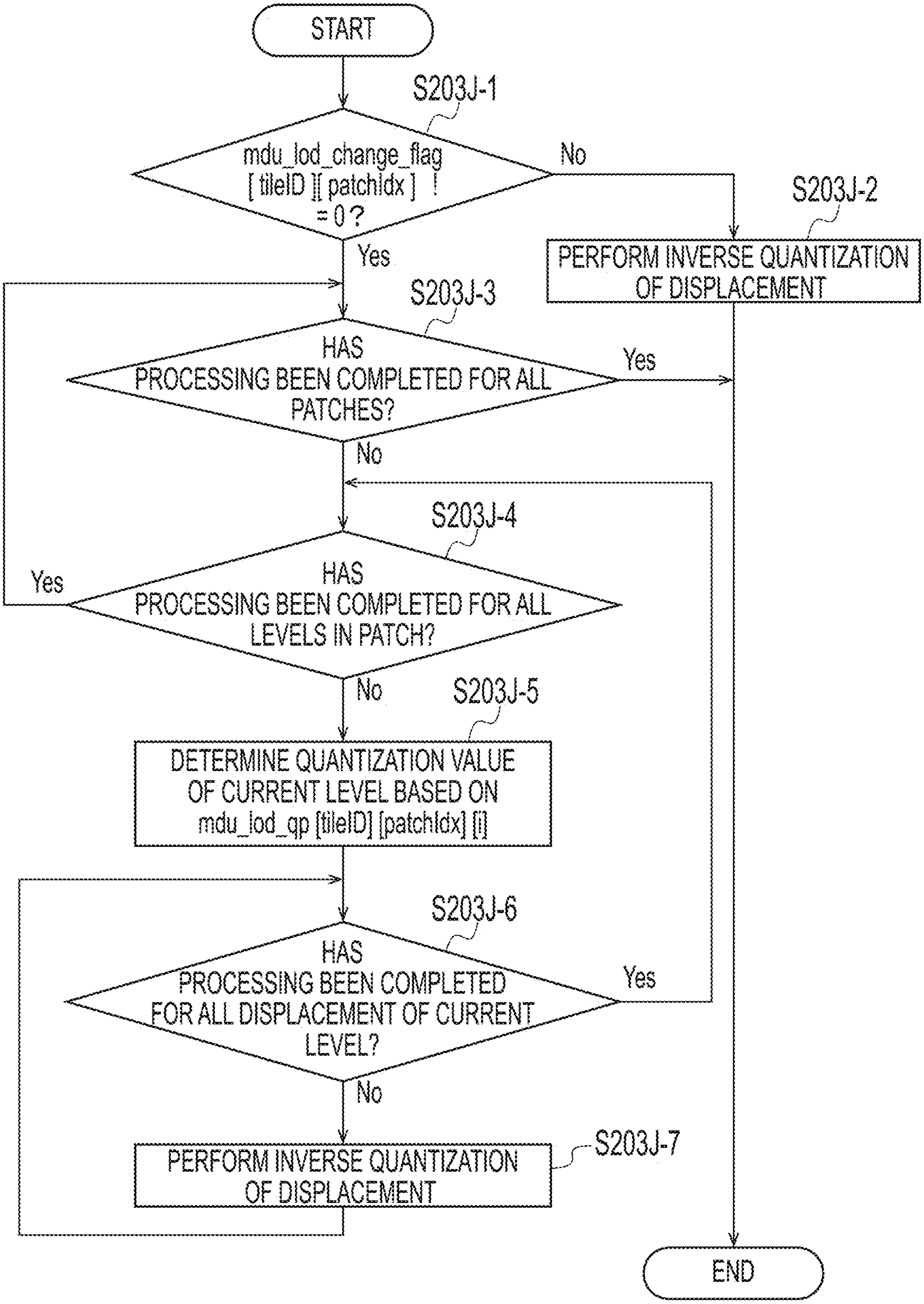
FIG. 18 is a flowchart illustrating an example of an operation of an inverse quantization unit 206J of the subdivided face decoding unit 206 of the mesh decoding device 200 according to an embodiment.

FIG. 18 is a diagram illustrating an example of a flowchart illustrating an example of an operation of the inverse quantization unit 206J. Hereinafter, an example of the operation of the inverse quantization unit 206J will be described with reference to FIG. 18.

As illustrated in FIG. 18, in step S203J-1, the inverse quantization unit 206J determines whether or not mdu_lod_change_flag [tileID] [patchIdx]!=0.

In the case of Yes, the operation proceeds to step S203J-3, and in the case of No, the operation proceeds to step S203J-2.

In step S203J-2, the inverse quantization unit 206J performs inverse quantization on all the subdivided faces, and ends the processing.

At this time, the inverse quantization unit 206J may perform the inverse quantization by using uniform quantization disclosed in Reference Literature 2 "Jinhua Yu, "Advantages of uniform scalar dead-zone quantization in image coding system" in 2004 International Conference on Communications, Circuits and Systems (IEEE Cat. No. 04EX914). IEEE, 2004, vol. 2, pp. 805-808", or may perform the inverse quantization by using another known inverse quantization method.

In step S203J-3, the inverse quantization unit 206J determines whether or not the processing has been completed for all the patches.

In the case of Yes, the operation ends, and in the case of No, the operation proceeds to step S203J-4.

In step S203J-4, the inverse quantization unit 206J determines whether or not the processing has been completed for all the levels in the patch.

In the case of Yes, the operation proceeds to step S203J-3, and in the case of No, the operation proceeds to step S203J-5.

In step S203J-5, the inverse quantization unit 206J determines the quantization value of the current level based on mdu_lod_qp [tileID] [patchIdx] [i], and the operation proceeds to step S203J-6.

In step S203J-6, the inverse quantization unit 206J determines whether or not the inverse quantization processing has been completed for all the subdivided faces of the current level.

In the case of Yes, the operation proceeds to step S203J-4, and in the case of No, the operation proceeds to step S203J-7.

In step S203J-7, the inverse quantization unit 206J performs the inverse quantization of the subdivided face by using the quantization value obtained in step S203J-5, and the operation proceeds to step S203J-6.

At this time, the inverse quantization unit 206J may perform the inverse quantization by using the uniform quantization disclosed in Reference Literature 2 described above, or may perform the inverse quantization by using another known inverse quantization method.

According to the present embodiment, it is possible to efficiently encode the subdivided face by using the same subdivided vertex normal in the same base face.

Furthermore, according to the present embodiment, since a decoding method can be set according to characteristics of the mesh in the patch, the number of bits of the subdivided face can be reduced.

The mesh encoding device 100 and the mesh decoding device 200 described above may be implemented as programs that cause a computer to execute each function (each step).

According to the present embodiment, for example, comprehensive improvement in service quality can be realized in moving image communication, and thus, it is possible to contribute to the goal 9 "Build resilient infrastructure, promote inclusive and sustainable industrialization and foster innovation" of the sustainable development goal (SDGs) established by the United Nations.

The invention claimed is:

1. A mesh decoding device comprising a circuit, wherein the circuit:

decodes an atlas bit stream and outputs patch information and frame information, wherein the atlas bit stream includes a patch data unit (PDU) corresponding to each patch, and the patch information is obtained by decoding the PDU;

changes a subdivision method based on the patch information and the frame information, wherein the patch information includes a control signal designating a type of the subdivision method of a base mesh for each patch; and changes an inverse quantization method based on the patch information, wherein the patch information further includes a flag designating whether or not to change a quantization value of a subdivided face for each subdivision level of the subdivided face for each patch, and the quantization value designated for each subdivision level for each patch.

2. The mesh decoding device according to claim 1, wherein the circuit calculates a subdivided vertex normal based on a method of calculating the subdivided vertex normal designated for each patch.

3. The mesh decoding device according to claim 1, wherein the circuit adjusts a subdivided mesh based on a subdivision adjustment method designated for each frame.

4. The mesh decoding device according to claim 1, wherein the mesh decoding unit includes an inverse quantization unit configured to perform inverse quantization of a displacement based on a quantization value designated for each patch.

5. The mesh decoding device according to claim 1, wherein the circuit performs inverse quantization of a displacement based on a quantization value for each subdivision level designated for each patch.

6. A mesh decoding method comprising:

decoding an atlas bit stream and outputting patch information and frame information, wherein the atlas bit stream includes a patch data unit (PDU) corresponding to each patch, and the patch information is obtained by decoding the PDU;

changing a subdivision method based on the patch information and the frame information, wherein the patch information includes a control signal designating a type of the subdivision method of a base mesh for each patch; and changing an inverse quantization method based on the patch information, wherein the patch information further includes a flag designating whether or not to change a quantization value of a subdivided face for each subdivision level of the subdivided face for each patch, and the quantization value designated for each subdivision level for each patch.

7. A program stored on a non-transitory computer-readable medium for causing a computer to function as a mesh decoding device, wherein the mesh decoding device includes a circuit, and the circuit:

decodes an atlas bit stream and outputs patch information and frame information, wherein the atlas bit stream includes a patch data unit (PDU) corresponding to each patch, and the patch information is obtained by decoding the PDU;

changes a subdivision method based on the patch information and the frame information, wherein the patch information includes a control signal designating a type of the subdivision method of a base mesh for each patch; and changes an inverse quantization method based on the patch information, wherein the patch information further includes a flag designating whether or not to change a quantization value of a subdivided face for each subdivision level of the subdivided face for each patch, and the quantization value designated for each subdivision level for each patch.

8. The mesh decoding device according to claim 1, wherein the patch information further includes a control signal designating a number of base faces included for each patch.

9. The mesh decoding device according to claim 1, wherein the patch information further includes a flag designating whether or not to perform subdivision for each patch.

* * * * *